Aug. 29, 1933.  L. A. McGLINCH  1,924,509
CORN PLANTER ATTACHMENT
Filed July 29, 1932   2 Sheets-Sheet 2

Inventor
Lowell A. McGlinch
By Clarence A. O'Brien
Attorney

Patented Aug. 29, 1933

1,924,509

UNITED STATES PATENT OFFICE 1,924,509

CORN PLANTER ATTACHMENT

Lowell A. McGlinch, Versailles, Ohio

Application July 29, 1932. Serial No. 626,142

2 Claims. (Cl. 111—33)

This invention appertains to new and useful improvements in planter attachments and the same has as its principal object to provide a wireless check-row hill marker especially adapted to use on tractors, horse-drawn and similar types of planters.

Another important object of the invention is to provide a simple and effective means for marking or indicating in the soil the hills as they are planted in order that said marks may be followed upon the return of the planter along the next row whereby the hills may be formed in the check-row and be aligned both longitudinally and transversely of the field.

Other important objects and advantages of the invention will become apparent to the reader of the following specification.

Figure 1:
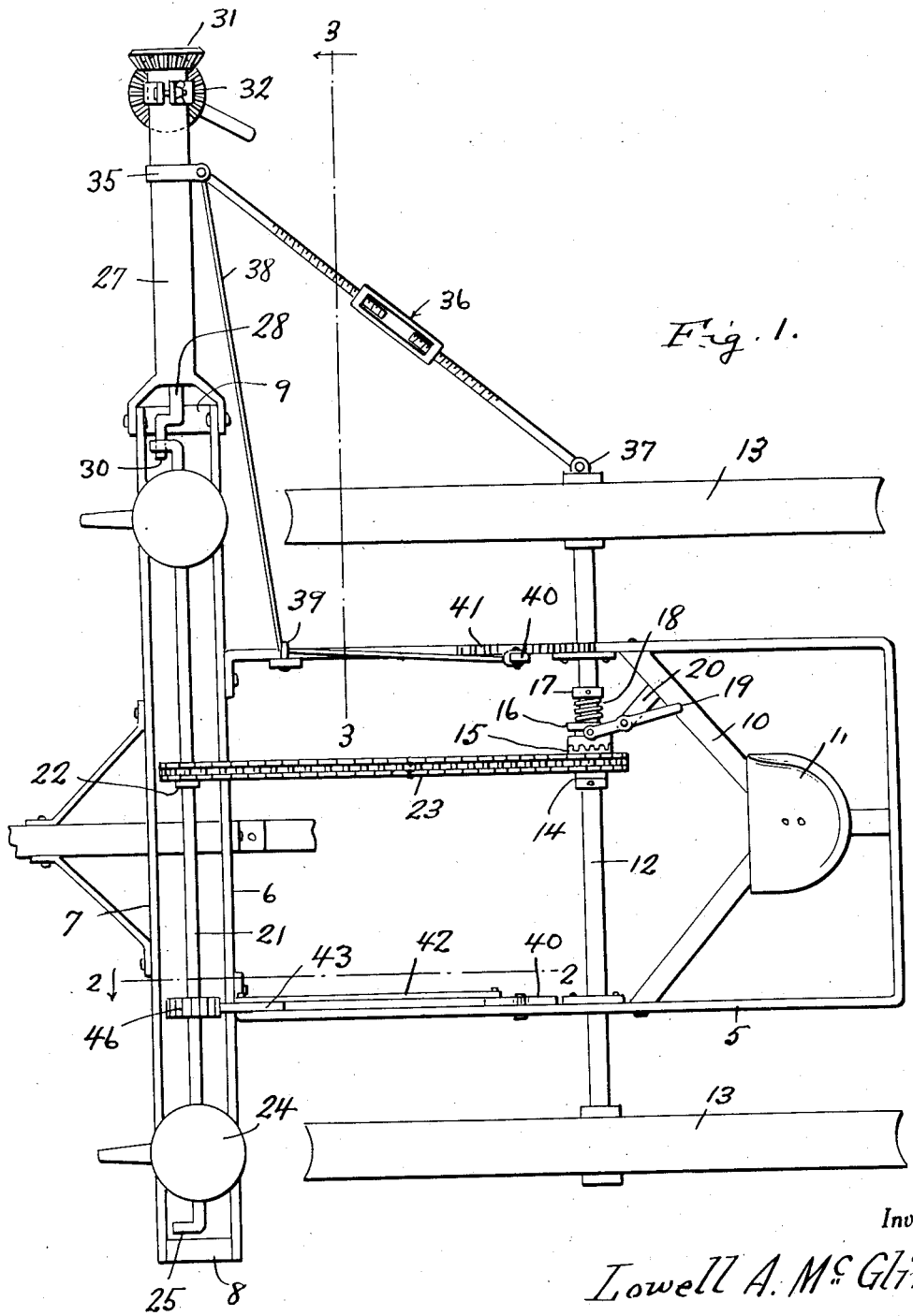
Figure 1 represents a top plan view of the planter and the attachment.
Figure 2:
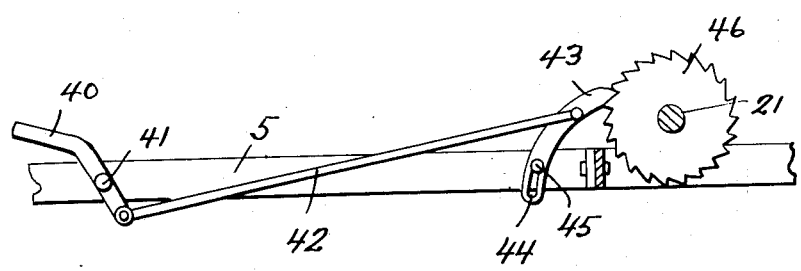
Figure 2 represents a fragmentary vertical sectional view taken substantially on line 2—2 of Figure 1.
Figure 3:
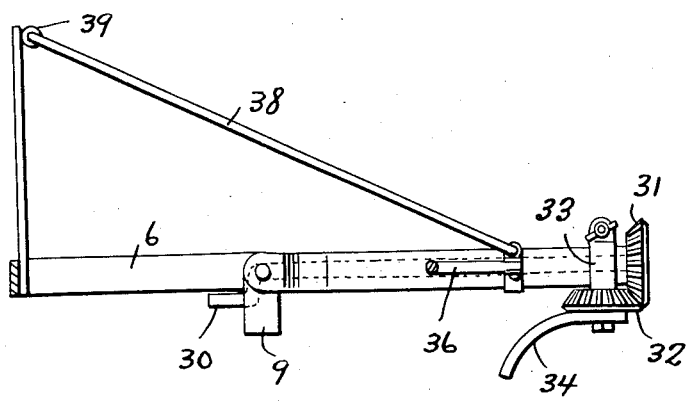
Figure 3 represents a vertical sectional view taken substantially on line 3—3 of Figure 1.

Referring to the drawings wherein like numerals designate like parts, it can be seen that the numeral 5 represents the frame of the planter machine which is of U-shape and has the extremities of its legs secured to the transverse bar 6. This bar 6 is a companion to the parallel bar 7, and these bars have their ends connected together by the bridge pieces 8—9.

Upon the braces 10 is mounted the operator's seat 11 while under this frame 5 and seat 11 is the axle 12, on each end of which is journalled the usual planter wheel 13.

Numeral 14 represents the drive gear on the axle 12 which is provided with the clutch head 15 opposed to the clutch element 16, the latter being splined to the axle 12. Between the clutch element 16 and the collar 17 on the shaft 12 is the spring 18 for normally urging the element 16 against the clutch head 15. Numeral 19 represents a lever swingable on the bracket 20 whereby the element 16 can be engaged or disengaged with respect to the clutch head 15, for connecting or disconnecting the axle 12 to the shaft 21 of the planter.

The shaft 21 is also equipped with a sprocket 22 and the sprocket chain 23 is trained over the sprockets 14 and 22. This shaft 21 extends to the planters 24 whereby the planters are operated and each end of the shaft 21 is equipped with a crank 25.

To either end of the frame defined by the bars 6—7 and bridge pieces 8 and 9 can be secured the leg portions 26 of the barrel 27 through which the shaft 28 extends. The inner end of this shaft 28 is provided with a crank 30 co-operative with the corresponding crank 25 on the shaft 21 while the outer end of the shaft 28 is provided with a bevel gear 31 meshing with the bevel gear 32 which is rotatable on the clamp mount 33, the latter being secured to the outer end of the barrel 27.

To this gear 32 is secured the arcuate shaped marking elements 34. A collar 35 on the barrel 27 has the turnbuckle connection generally referred to by numeral 36 interposed between the same and the eye 37 on the hub of the corresponding wheel 13. This turnbuckle permits proper alinement of the barrel 27 and its shaft 28 with the shaft 21.

Also extending from the collar 35 is the cable 38, the same extending through an eye 39 on the frame 5 to connect to the lever 40. This lever is equipped with a detent co-operative with the rack 41 on the frame 5.

Obviously, when the axle 12 is driving the chain 23, the shaft 21 is operating and also the planters 24 and at the same time the shaft 28, and which in turn rotates the markers 34 and makes the proper impressions in the soil.

However, in starting a new row, it may be necessary to realine the marker 34 and this is accomplished by feeding the shaft 21 by moving the lever 40. This lever is swingable as at 41 on the frame 5 and has a connecting rod 42 extending between the same and the claw or pawl 43. This pawl 43 is provided with an arcuate slot 44 through which a pin 45 extends from the frame 5.

On the shaft 21 is the sprocket wheel 46 and obviously, it can be seen that when the lever 40 is reciprocated, a corresponding motion of the pawl 43 will feed the ratchet wheel 46 and rotate the shaft 21, step-by-step, so that the proper readjustment of the marker 24 can be obtained.

While the foregoing specification sets forth the invention in specific terms, it is to be understood that numerous changes in the shape, size, and materials may be resorted to without departing from the spirit and scope of the invention as claimed hereinafter.

I claim:

1. In a planter, an operating shaft, a second shaft pivotally mounted to said operating shaft, and actuated thereby, a pinion connected to the free end of said second shaft, a vertically disposed pivotally mounted shaft adjacent the free end of said second shaft and having a laterally extending arcuate shaped marker secured thereto, a gear secured to said vertical shaft and driven by said pinion gear, means for adjusting said second shaft with respect to the operating shaft, and means for actuating said operating shaft.

2. In a planter, an operating shaft, a second shaft pivotally mounted to said operating shaft and actuated thereby, a pinion gear connected to the free end of said second shaft, a vertically disposed pivotally mounted shaft adjacent the free end of said second shaft and having a laterally extending arcuate shaped marker secured thereto, a gear secured to said vertical shaft and driven by said pinion gear, means for adjusting said second shaft with respect to the operating shaft, means for actuating said operating shaft, and means whereby the operating shaft can be adjusted step-by-step.

LOWELL A. McGLINCH.